United States Patent
Doukhvalov et al.

(10) Patent No.: US 11,222,124 B2
(45) Date of Patent: Jan. 11, 2022

(54) SYSTEM AND METHOD OF STEPWISE INCREASING THE IT SECURITY OF ELEMENTS OF A TECHNOLOGICAL SYSTEM

(71) Applicant: AO Kaspersky Lab, Moscow (RU)

(72) Inventors: Andrey P. Doukhvalov, Moscow (RU); Pavel V. Dyakin, Moscow (RU); Dmitry A. Kulagin, Moscow (RU)

(73) Assignee: AO Kaspersky Lab, Moscow (RU)

(*) Notice: Subject to any disclaimer, the term of this patent is extended or adjusted under 35 U.S.C. 154(b) by 227 days.

(21) Appl. No.: 16/504,911

(22) Filed: Jul. 8, 2019

(65) Prior Publication Data

US 2020/0311282 A1 Oct. 1, 2020

(30) Foreign Application Priority Data

Mar. 29, 2019 (RU) .......................... RU2019109169

(51) Int. Cl.
*G06F 21/00* (2013.01)
*G06F 21/57* (2013.01)
*G06F 21/55* (2013.01)
*G06F 21/56* (2013.01)

(52) U.S. Cl.
CPC .......... *G06F 21/577* (2013.01); *G06F 21/554* (2013.01); *G06F 21/562* (2013.01); *G06F 2221/034* (2013.01); *G06F 2221/2149* (2013.01)

(58) Field of Classification Search
CPC ....... G06F 2221/2149; G06F 2221/034; G06F 21/562; G06F 21/554; G06F 21/577; G06F 21/00; G06F 21/50; G06F 21/60
USPC .......................................................... 726/24
See application file for complete search history.

(56) References Cited

U.S. PATENT DOCUMENTS

| | | | |
|---|---|---|---|
| 8,171,275 B2* | 5/2012 | Crowder, Jr. ........... | G06F 21/31 713/2 |
| 10,140,543 B2 | 11/2018 | Fridakas | |
| 2013/0347131 A1* | 12/2013 | Mooring ................. | G06F 21/50 726/29 |
| 2014/0189860 A1 | 7/2014 | Hull Roskos | |
| 2015/0088733 A1 | 3/2015 | Monastyrsky et al. | |

(Continued)

FOREIGN PATENT DOCUMENTS

WO 2018044410 A1 3/2018

*Primary Examiner* — Josnel Jeudy (74) *Attorney, Agent, or Firm* — Arent Fox LLP; Michael Fainberg (57) ABSTRACT

The present disclosure provides systems and methods to stepwise increasing the IT security of elements of a technological system. In an exemplary aspect, the method comprises gathering data on technological systems and a plurality of elements comprising the technological system by intercepting traffic between the plurality of elements using data exchange protocols, identifying vulnerable elements of the technological system by one or more of: detecting suspicious actions on the vulnerable elements and statistical data relating to the elements, analyzing the vulnerable elements to generate a classification of severity of vulnerabilities of the vulnerable elements, identifying most vulnerable portions of the vulnerable elements as compared to other elements in the vulnerable elements, operating the most vulnerable portions of the vulnerable elements in a protected environment.

15 Claims, 5 Drawing Sheets

(56) References Cited

U.S. PATENT DOCUMENTS

| | | | |
|---|---|---|---|
| 2015/0373044 A1* | 12/2015 | Stiansen | H04L 63/1408 726/22 |
| 2017/0098071 A1 | 4/2017 | Stopel et al. | |
| 2017/0244752 A1* | 8/2017 | Gordeychik | H04L 67/1095 |
| 2019/0349733 A1* | 11/2019 | Nolan | H04W 12/69 |
| 2021/0049263 A1* | 2/2021 | Kiperberg | G06F 21/602 |

* cited by examiner

SYSTEM AND METHOD OF STEPWISE INCREASING THE IT SECURITY OF ELEMENTS OF A TECHNOLOGICAL SYSTEM

CROSS REFERENCE TO RELATED APPLICATIONS

This application claims benefit of priority under 35 U.S.C. 119(a)-(d) to Russian Patent Application No. 2019109169 filed Mar. 29, 2019, which is herein incorporated by reference in its entirety

FIELD OF TECHNOLOGY

The disclosure relates to the field of cybersecurity and, more specifically, to systems and methods of stepwise increasing the IT security of elements of a technological system.

BACKGROUND

One of the current problems of industrial security is the problem of safe functioning of technological processes (TP). The principal threats to the functioning of TP may include unintentional mistakes or malicious actions in the operational control, wear and failure of equipment and subunits, computer attacks on control systems and the IT system, and others.

Automated control systems (ACS) at the enterprises control the technological systems and also need to be given an adequate level of security. The elements of technological systems, as well as the operating systems and firmware controlling those elements, often become obsolete. Nor is their frequent updating possible, since this leads to interruptions in the technological processes. Furthermore, new versions of the programs may also contain errors having a negative impact on the functional stability of the elements of the technological systems. Furthermore, existing obsolete ACSs, designed to stand in isolation, are often connected to computer networks and do not have the means for ensuring IT security in event of malicious action from the outside.

Furthermore, the existing solutions for control of technological systems were developed without heed for the present-day essential security requirements, which poses the problem of increasing their level of protection. Unfortunately, the existing solutions are usually rather complicated with a large volume of legacy code, which significantly complicates their reworking, making it exceedingly resource-hungry and risky, both from a business standpoint and a technical standpoint.

It should be noted that the personnel working at the enterprises also often lack sufficient skills in IT security, they do not employ strong passwords, they connect their personal data storage media and mobile devices to the computers and servers, use social networks and personal email, and open attachment files from letters and messages, which may result in an infecting of those computers with malicious software, incidents involving computer security, and so forth.

A solution is needed which increases the IT security of technological systems.

SUMMARY

The present disclosure describes systems and methods to stepwise increasing the it security of elements of a technological system.

The technical result of the present disclosure is to realize the stated purpose

According to one variant aspect, a method is presented for stepwise increasing the it security of elements of a technological system comprising gathering data on technological systems and a plurality of elements comprising the technological system by intercepting traffic between the plurality of elements using data exchange protocols, identifying vulnerable elements of the technological system by one or more of: detecting suspicious actions on the vulnerable elements and statistical data relating to the elements, analyzing the vulnerable elements to generate a classification of severity of vulnerabilities of the vulnerable elements, identifying most vulnerable portions of the vulnerable elements as compared to other elements in the vulnerable elements, and operating the most vulnerable portions of the vulnerable elements in a protected environment.

In one aspect of the method, the data on the technological system comprises a structure of one or more levels of the technological system, and a plurality of links between the plurality of elements at and across each level.

In one aspect, the method further comprises monitoring the plurality of elements of the technological systems to gather error and malfunction information, comprising one or more of: failure of a sensor, infecting of a computer with a virus and opening of a malicious file.

In one aspect of the method, the statistical data indicates errors and failures during a predetermined period of time for each of the vulnerable elements.

In one aspect, the method further comprises identifying a possibility of a functioning of an element of the technological system under control of a protected operating system by analyzing hardware components of the element and compatibility with the protected operating system, wherein the protected environment is the protected operating system In one aspect, the method further comprises launching the protected operating system in hypervisor mode and transferring a portion of functions of the vulnerable elements to the protected operating system to securely control exchange of data between the plurality of elements of the technological system.

In one aspect of the method, the technological system is functionally available during the transferring.

In one aspect of the method, operating the most vulnerable portions of the vulnerable elements in a protected environment comprises providing interaction between elements whose protection is increased and other elements of the plurality of elements using an agent installed in the technological system.

In one aspect of the method, operating the most vulnerable portions of the vulnerable elements in a protected environment comprises: transferring control of the vulnerable portions of the vulnerable elements to a protected operating system.

In other exemplary aspects, a security system of stepwise increasing the IT security of elements of a technological system is provided. The security system may comprise a hardware processor configured to: gather data on technological systems and a plurality of elements comprising the technological system by intercepting traffic between the plurality of elements using data exchange protocols, identify vulnerable elements of the technological system by one or more of: detecting suspicious actions on the vulnerable elements and statistical data relating to the elements, analyze the vulnerable elements to generate a classification of severity of vulnerabilities of the vulnerable elements, identify most vulnerable portions of the vulnerable elements as compared to other elements in the vulnerable elements, operate the most vulnerable portions of the vulnerable elements in a protected environment.

In other exemplary aspects, instructions for executing the above described methods may be included on non-transitory computer-readable media.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of stepwise increasing the it security of elements of a technological system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following definitions and concepts will be used in describing variant aspects of the disclosure.

In one aspect, an object of control is a technological object subjected to external actions (controlling and/or suspicious) for the purpose of changing its state. In a particular aspect, objects of control may include a device (such as an electric motor) and/or a technological process (or a portion thereof).

In one aspect, a technological process (TP) is a process of material production, consisting of a sequential changing of states of a material entity (the subject of work).

In one aspect, the control of a technological process (process control) is a set of methods used to control the process variables of the technological process during the production of an end product.

In one aspect, a process variable (PV) is a current metered value of a particular portion of a TP which is being observed or monitored. A process variable might be, for example, a measurement from a sensor.

In one aspect, an external action is a method of changing the state of an element subjected to the action, such as an element of a technological system (TS), in a particular direction. In some aspects the action is transmitted from one element of the TS to another element of the TS in the form of a non-transitory signal.

In one aspect, the state of an object of control is the totality of its essential attributes, as expressed by parameters of state that are altered or maintained under the influence of external actions, including control actions from a control subsystem.

In one aspect, a parameter of state is one or more numerical values characterizing an essential attribute of an object. In one particular aspect, the parameter of state is a numerical value of a physical quantity.

In one aspect, a formal state of an object of control is the state of the object of control corresponding to the process chart and other technological documentation (in the case of a TP) or a timetable (in the case of a device).

In one aspect, a controlling action is a deliberate (the goal of the action is to act on the state of the object), legitimate (provided for by the TP) external action on the part of the control subjects of a control subsystem on an object of control, resulting in a change of state of the object of control or a maintaining of the state of the object of control.

In one aspect, a suspicious action is a deliberate or unintentional illegitimate (not provided for by the TP) external action on the state of an object of control, including an action on the part of the control subject.

In one aspect, the control subject is a device which applies a controlling action to an object of control or transmits a controlling action to another control subject for transformation before being applied directly to the object.

In one aspect, a multilevel control subsystem is a collection of control subjects that involves several levels.

In one aspect, a cyber-physical system is an IT concept meaning the integration of computing resources into physical processes. In such a system, the sensors, equipment, and IT systems are connected along the entire chain of creation of a value beyond the boundaries of a single enterprise or business. These systems interact with each other by means of standard Internet protocols for the predicting, self-adjusting and adapting to changes. Examples of a cyber-physical system are a technological system and an industrial Internet of Things.

In one aspect, the Internet of Things (IoT)) is a computer network of physical objects ("things") equipped with built-in technologies for interacting with each other or with the outside world. The Internet of Things includes such technologies as portable devices, electronic systems of means of transportation, smart cars, smart cities, industrial systems, and others.

In one aspect, an Industrial Internet of Things (IoT) is a subcategory of the Internet of Things which also includes applications oriented to the consumer, such as portable devices, "smart home" technologies and cars with automatic control. A distinguishing feature of both concepts is devices with built-in sensors, machine tools and infrastructure sending data through the Internet and controlled by means of software.

In one aspect, a technological system (TS) is a functionally interrelated group of control subjects of a multilevel control subsystem and an object of control (a TP or a device), realizing through a change in state of the control subjects a change in state of the object of control. The structure of the technological system is formed by the basic elements of the technological system (the interrelated control subjects of the multilevel control subsystem and the object of control), and also the links between these elements. In the event that the object of control in the technological system is a technological process, the end goal of the control is: by a change in the state of the object of control, to change the state of the work object (raw material, blanks, etc.). In the event that the object of control in the technological system is a device, the end goal of the control is to change the state of the device (a means of transportation, a spacecraft). The functional relationship of the elements of the TS means a relationship of the states of these elements. There might not even be a direct physical link between the elements, for example, a physical link between actuators and a technological operation is absent, yet the cutting speed for example is functionally related to the rotational speed of a spindle, even though these parameters of state are not physically connected.

In one aspect, the state of a control subject is the totality of its essential attributes, expressed by the parameters of state, and which can be altered or maintained under the influence of external actions.

In one aspect, the essential attributes (and accordingly the essential parameters of state) of a control subject are attributes having a direct influence on the essential attributes of the state of the object of control. The essential attributes of the object of control are attributes having a direct influence on the functional factors being controlled (precision, safety, efficacy) for the TS. For example, cutting conditions corresponding to formally specified conditions, the progress of a train corresponding to its itinerary, the maintaining of a reactor temperature within permissible ranges. Depending on the factors being controlled, the parameters of state of the object of control are selected and accordingly related parameters of state of the control subjects exerting a controlling action on the object of control are selected.

In one aspect, a hypervisor (a monitor of virtual machines) is a program containing a functional environment for other programs (including other hypervisors) by simulating computer hardware and controlling that hardware and the guest operating systems functioning in that environment.

In one aspect, the elements of a system to analyze a file for harmfulness in a virtual machine refers to, in the present disclosure, actual devices, systems, elements, groups of elements, realized with the use of hardware such as integrated microcircuits (application-specific integrated circuit, ASIC) or field-programmable gate arrays (FPGA) or, for example, in the form of a combination of software and hardware such as a microprocessor system and a set of program instructions, and also based on neurosynaptic chips. The functionality of the indicated elements of the system may be realized exclusively by hardware, and also in the form of a combination, where some of the functionality of the elements of the system is realized by software and some by hardware. In certain variant aspects, some of the elements or all of the elements can be implemented on the processor of a general-purpose computer (such as the one depicted in FIG. 4). The elements as a whole of the system may be realized within either a single computing device or spread out between several interlinked computing devices.

Figure 1A:
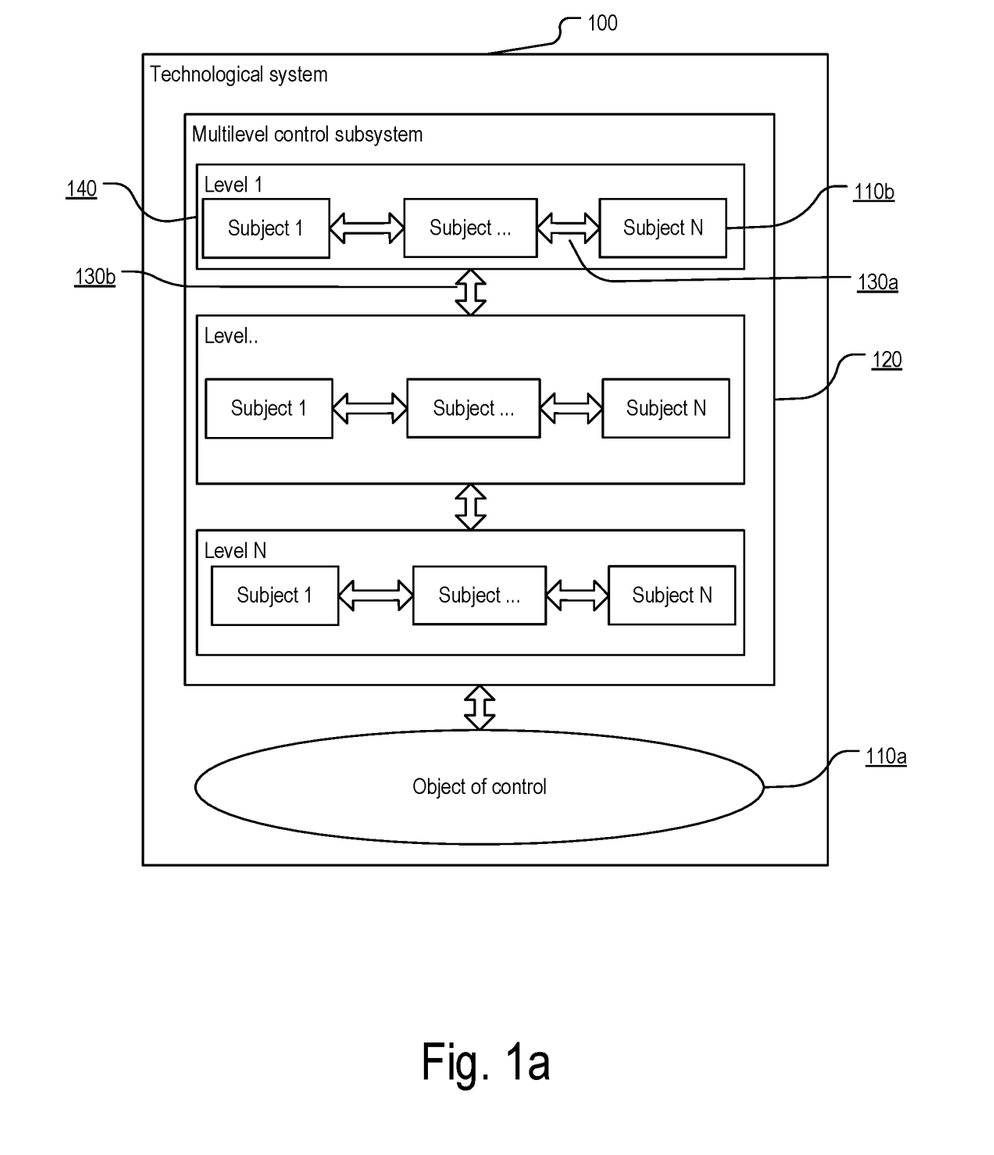
FIG. 1a schematically shows an example of a technological system.

FIG. 1a schematically shows an example of a technological system 100 comprising the elements 110a and 110b, where the elements of the TS are: an object of control 110a; control subjects 110b, forming a multilevel control subsystem 120; horizontal links 130a and vertical links 130b. The control subjects 110b are grouped by levels 140.

Figure 1B:
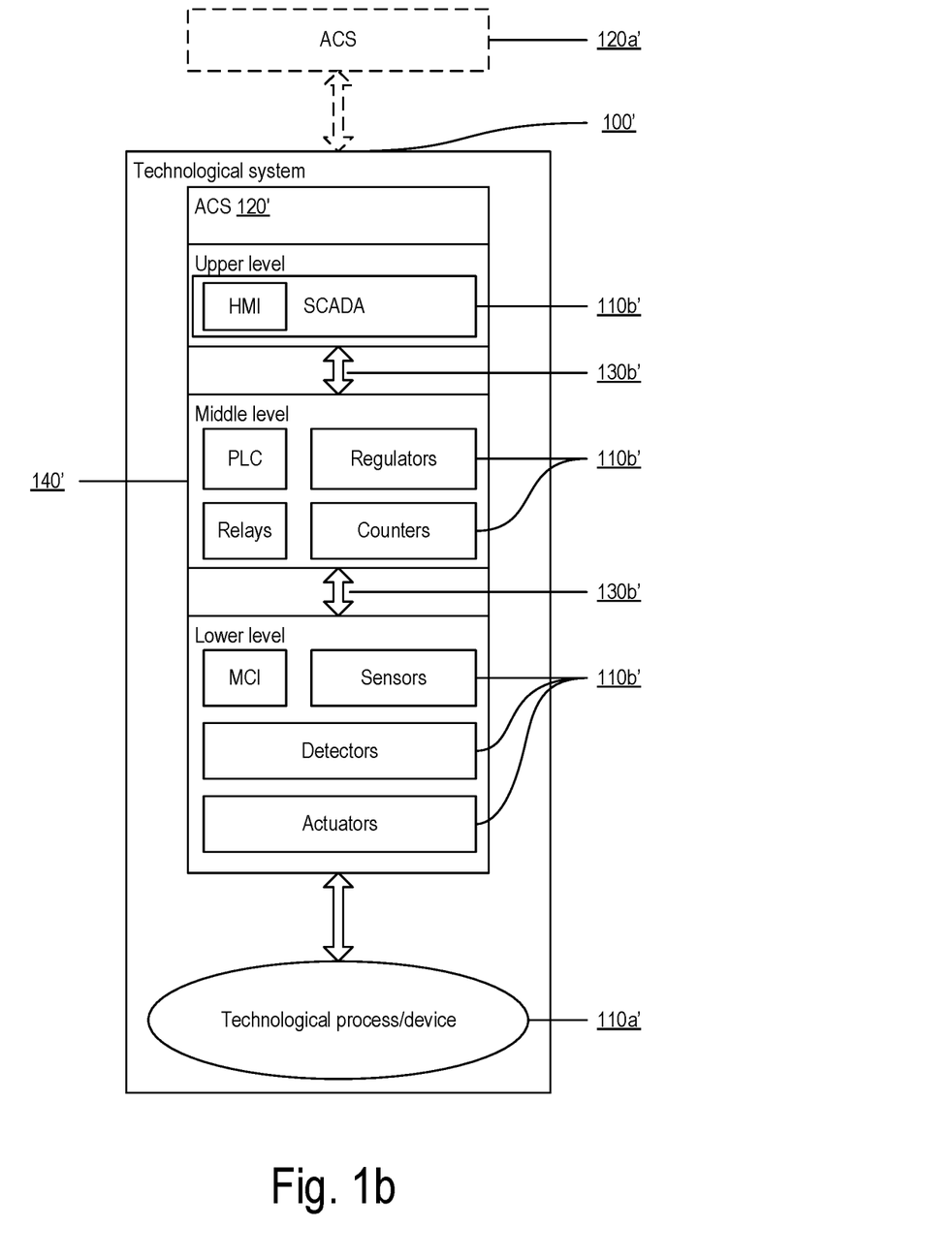
FIG. 1b schematically shows a particular example of the implementation of a technological system, in accordance with exemplary aspects of the present disclosure.

FIG. 1b schematically shows a particular example of the implementation of a technological system 100'. The object of control 110a' is a TP or a device. Controlling actions are directed to the object of control 110a' and the controlling actions are elaborated and realized by an automated control system (ACS) 120'. Three levels 140' are distinguished in the ACS consisting of the control subjects 110b' interrelated to each other both horizontally by horizontal links (links within the level, not shown in the figure) and vertically by vertical links 130b' (links between levels). The relationships are functional, i.e., in the general case a change in state of a control subject 110b' on one level elicits a change in the states of the control subjects 110b' connected to it on the same level and on other levels. Information about the change in state of the control subject is transmitted in the form of a signal along the horizontal and vertical links established between the control subjects, i.e., information about the change in state of the control subject in question is an external action with respect to the other control subjects 110b'. The levels 140' in the ACS 120' are identified in accordance with the purpose of the control subjects 110b'. The number of levels may vary in dependence on the complexity of the ACS 120'. Simple systems may contain one or more lower levels. For the physical linkage of the elements of the TS (110a, 110b) and the subsystems of the TS 100, wire networks, wireless networks, integrated microcircuits may be used. For the logical linkage between the elements of the TS (110a, 110b) and the subsystems of the TS 100, Ethernet, industrial Ethernet, or industrial networks may be used. The industrial networks and the protocols used are of various types and standards: Profibus, FIP, ControlNet, Interbus-S, DeviceNet, P-NET, WorldFIP, LongWork, Modbus and others.

The upper level (the level of supervisory control and data acquisition, SCADA) is the level of dispatcher/operator control and includes at least the following control subjects 110b': controllers which control computers and human-machine interfaces (HMI) (FIG. 1b shows the SCADA within a single control subject). This level is designed to track the states of the elements of the TS (110a', 110b'), to obtain and compile information about the state of the elements of the TS (110a', 110b'), and to correct it if necessary.

The middle level (the CONTROL level) is the level of the controllers and includes at least the following control subjects: programmable logic controllers (PLC), counters, relays, regulators. The control subjects 110b' of PLC type receive information from the control subjects of "measurement and control equipment" type and from the control subjects 110b' of "sensor" type as to the state of the object of control 110a'. The control subjects of PLC type elaborate (create) a controlling action in accordance with a programmed control algorithm for the control subjects of "actuator" type. The actuators realize this directly (apply it to the object of control) at the lower level. An actuator is part of an actuating device (equipment).

The lower level (the Input/Output level) is the level of such control subjects as: sensors and detectors, measurement and control instruments (MCI) which control the state of the object of control 110a', and also actuators. The actuators act directly on the state of the object of control 110a', in order to bring it into compliance with a formal state, i.e., a state complying with a technological mission, a technological chart or some other technological documentation (in the case of a TP) or a timetable (in the case of a device). On this level, the signals from the control subjects 110b' of "sensor" type are coordinated with the inputs of the control subjects of the middle level 140', and the controlling actions elaborated by the control subjects 110b' of "PLC" type are coordinated with the control subjects 110b' of "actuator" type that implement them. An actuator is part of an actuating device. An actuating device moves a regulating element in accordance with signals arriving from the regulator or a controlling device. Actuating devices are the last link in the chain of automatic control and in the general case consist of the units:

- an amplifying device (contactor, frequency converter, amplifier, and so on);
- an actuator (electric, pneumatic or hydraulic drive) with feedback elements (sensors of the position of an output shaft, a signaling of end positions, a manual drive, and so forth);
- a regulating element (gates, valves, slides, dampers, and so forth).

Depending on the application conditions, actuating devices may differ in their design. The actuators and regulating elements are usually among the basic units of the actuating devices.

In a particular example, the actuating device as a whole is known as the actuator.

The enumerated control subjects (110a', 110b') of the different levels are the elements of the technological system 110.

Figure 2:
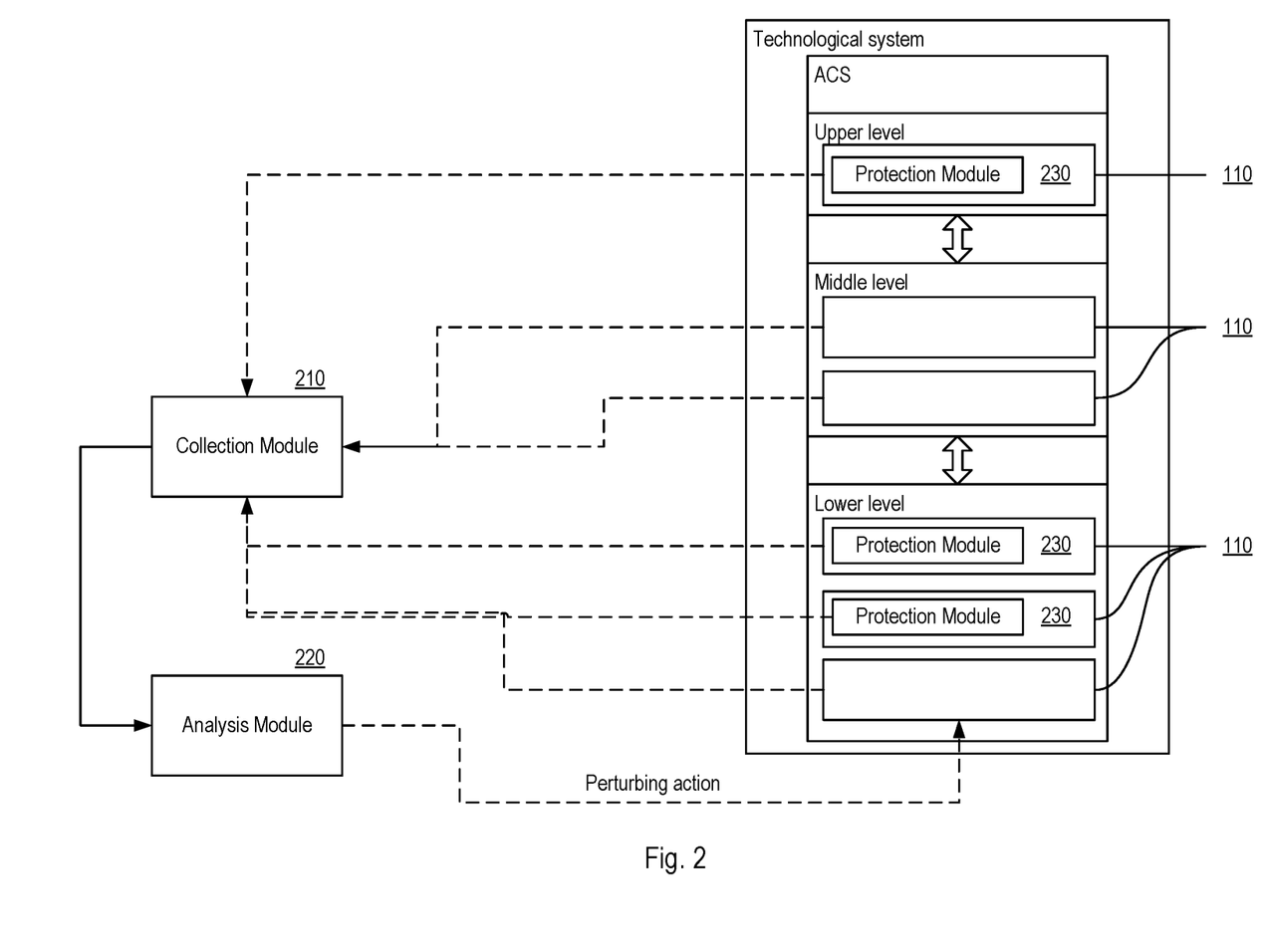
FIG. 2 shows an example of the realization of the proposed system for stepwise increasing of the IT security of a technological system, in accordance with exemplary aspects of the present disclosure.

FIG. 2 shows a system of stepwise increasing the IT security of a technological system. The approach is based on the idea of singling out the elements of the technological system 110 having the greatest need for increased IT security and transferring them gradually to an independent and isolated environment with the aid of virtualization technology. In exemplary aspects, stepwise increases in the IT security refer to the sequential transfer of different levels of the technological system into a protected virtual environment. At each stage (step), the system described in FIG. 2 selects the element(s) of the technological system 110 that are most in need of increased security, as compared to other elements of the technological system 110. The stages are repeated until an adequate (as defined by an administrator or the like) level of safety of the entire technological system 110 is reached. The gradual transfer of elements to a protected virtual environment may, in some aspects, occur smoothly without stopping the processes in the technological system 110. In addition, when transferring an element(s) to a virtual environment, there may be a failure rate (e.g., an error in testing scripts during transfer, incompatibility of an element with a virtual environment, or other factors). For example, when transferring a single element to the protected virtual environment, the probability of failure is minimal (e.g., less than a predetermined threshold), while transferring multiple elements or the entire system at once to the protected virtual environment, the probability of failure increases proportionally.

The system for increasing the IT security of a technological system contains a collection module 210, an analysis module 220, and a protection module 230.

The collection module 210 is designed to:
gather data about the technological system;
gather data about each element 110 of the technological system;
send the data so gathered to the analysis module 220.

In one variant aspect, the collection module 210 gathers data about the TS, including at least the structure of the TS. In another variant aspect, the collection module 210 gathers data about each level of the TS, including at least the structure of the level and the links of the elements 110 of the level to each other and to the elements 110 of other levels of the TS. In yet another variant aspect, the collection module 210 gathers data about supplemental IT systems supporting the functioning of the technological system. The supplemental IT systems contain servers, user workstations, channels for communication with elements of the technological system 110 and with external servers, mobile devices, devices of the Industrial Internet of Things, and data storage media.

In the general case, the data gathered by the collection module 210 contains information about each element 110 of the technological system.

In one variant aspect, the collection module 210 functions on a server and gathers information about the elements of the TS 110 remotely, for example, by intercepting traffic between the elements of the TS 110 or by interacting with the elements of the TS 110 with the use of industrial data exchange protocols. In another variant aspect, the collection module 210 may reside on an element of the TS 110, for example in the form of a program agent, which gathers the necessary data about the element of the TS 110 and its links to other elements of the TS 110.

In one variant aspect, the collection module 210 will carry out a monitoring of the elements of the TS 110, in order to gather statistics on errors and malfunctions occurring during its functioning. For example, the failure of a sensor, the infecting of a computer with a virus due to the connection of an external device (for example, by using a USB port) or by opening a malicious file (such as one received with the use of email and social engineering).

The data so gathered is sent by the collection module 210 to the analysis module 220.

The analysis module 220 is designed to:
identify, during each step, the vulnerabilities of each level of the technological system;
identify the different severities of vulnerability of the elements, and identifying at least one most vulnerable element (e.g., the element with the most severe vulnerabilities);
send the solution to the intercept means.

The analysis module 220 operates with the data so received and thus will perform an analysis of the existing technological system by identifying the elements of the TS 110 which are in need of IT protection first and foremost. For this, vulnerabilities are identified on different levels of the TS. In one variant aspect, methods of identifying vulnerabilities known in the prior art are used by the analysis module 220. In one variant aspect, the vulnerabilities are identified by a suspicious action on an element of the TS 110 from the analysis module 220. In this case, data reflecting the reaction of the element of the TS 110 to the suspicious action may be gathered by the collection module 210 and again sent to the analysis module 220. In yet another variant aspect, the analysis module 220 identifies vulnerabilities on the basis of statistical data, for example, the most vulnerable element of the TS 110 is taken to be the element with the greatest number of errors and failures occurring during its functioning or during a particular period of time.

In another variant, the analysis module 220 identifies the vulnerable elements of the TS 110 by statistical data, for example, by the number of failures of an element, by the number or frequency of errors occurring during its functioning.

After identifying the vulnerability on the level of the TS, the analysis module 220 identifies at least one element of the TS 110 needing to be acted upon in order to increase the IT protection of the element.

In the general case, the analysis module 220 identifies the possibility of the functioning of the element of the technological system 110 under the control of a protected operating system (such as Kaspersky OS®. This can be realized, for example, with the help of an analysis of the hardware components of the element of the TS 110 and their compatibility with a secure operating system.

The analysis module 220 sends the results of the analysis to the protection module 230.

The protection module 230 is designed to:
be installed on the identified vulnerable elements of the technological system;
carry out at least one action ensuring the IT security of the element of the technological system 110.

In one aspect, the action that ensures the information security of the element of the technological system is implemented as executing the functioning of the element of the technological system under the control of a protected operating system running in the hypervisor mode. In another variant aspect, the action ensuring the information security of the technological system element includes launching a protected operating system on the technological system element.

The protection module 230 in the general case is a protected operating system and is designed to be installed on an element of the technological system 110.

In one variant aspect, the protected operating system is launched in hypervisor mode, which makes it possible to run in the protected environment the existing operating systems and applications of the elements of the TS 110 that are difficult/costly/risky to revise. It is important to understand that, in a preferable variant aspect of the present disclosure, the principal function of the hypervisor is to increase the IT security of the elements of the TS 110, and not to divide up the resources of the hardware platform among different guest operating systems, as is done in the classical use of a hypervisor. Thus, given an existing technological system not providing the requisite level of IT security, some of the functions of the elements of the TS 110 will be transferred to or duplicated in the protection module 230. The consecutive transfer of elements of the TS 110 in need of increased IT security to the control of a protected operating system or to a guest operating system under the control of a hypervisor enables an additional controlling of the exchange of information between the elements of the TS 110. The functional technological system is fully available during each step of this consecutive transfer.

In one variant aspect, the protection module 230 interacts with the element of the technological system 110 whose security has been increased by the protection module 230 via an agent installed on the element of the technological system 110.

Examples of the realization of the present system shall be discussed below.

Example 1. There is an upper-level control subject of the technological system, an element of the technological system 110 under the control of the OS Windows or Linux. It is necessary to increase the IT security of the control subject. For example, a SCADA application under the OS Windows. It is commonly known that the OS Windows is not an IT-protected environment. Furthermore, the frequent installing of updates eliminating critical vulnerabilities results in interruptions of the technological process and has a degree of risk to the business processes. It should also be mentioned that oftentimes personnel do not have adequate skills in terms of IT security (they might be connecting flash memory or a personal telephone to the control subject of the TS).

Furthermore, it is commonly known that malicious applications after compromising a control subject and performing malicious activity wipe the records from the system logs as to the events generated by the activity of the malicious application.

In one variant aspect, all the records in the logs are sent at once, by the agent implemented in the guest operating system and installed on the element of the technological system 110, to the protection module 230 implemented in hypervisor mode. In this case, the malicious application being implemented in the guest operating system cannot conceal its activity from the protection module 230.

A similar exemplary aspect is the processing of audit logs (which user was active in the guest OS and when). The audit logs can be sent by the agent implemented in the guest operating system to the protection module 230.

Another exemplary aspect is the sending of the logs of individual applications (such as SCADA) implemented in the guest operating system by the agent implemented in the guest operating system to the protection module 230.

Yet another variant aspect is the control of the hardware with the aid of the protection module 230. Thus, at the hypervisor level a flexible regulating of the policy for access to USB ports is possible, for example, forbidding access if a user is working in the guest OS, and allowing it if an administrator is working in the guest OS.

It is also possible to increase the security of a remote connection with the aid of the protection module 230. If the OS on an element of the technological system 110 has been compromised (remote access is turned on, some application or service for remote access has been installed), entry will not occur thanks to the hypervisor, which in this case will play the role of a supplemental firewall. In yet another variant aspect, remote access to a guest OS can be realized with the use of a two-factor authentication in the protection module 230.

In yet another exemplary aspect, separate applications (such as SCADA) make use of the capabilities of the protection module 230. For example, since a mechanism for control of the security policies is realized in the hypervisor, there is no need to embed an analogous mechanism in that application. It is enough to add the capability of accessing the hypervisor for certain permissions and obtaining the solutions.

In yet another variant aspect, in the event that a control subject is functioning with anomalies (a suspicious action has been applied to the control subject) the protection module 230 may forbid the interaction of the application (such as SCADA) with the control subject.

Since the application (e.g., SCADA) operates in a virtual environment, the application does not detect the protection module 230 because the application may, for example, represent a protected operating system and operate at the hypervisor level. Accordingly, the application is not aware of the existence of the protection module 230. The protection module 230, in turn, at the hypervisor level intercepts packets outgoing from the application in the guest operating system, and determines that the data packet is sent by the application (e.g., SCADA) to the unsafe element. This determination may be performed by examining, for example, the composition of the data packet or by an agent in the guest OS, though the present disclosure is not limited thereto.

Example 2. In the technological system is used an outdated element 110 of the TS (for example, a control subject of lower level), whose software cannot be updated by the maker of the element of the TS 110. Furthermore, this element of the TS 110 has incomplete compatibility with new processes of the technological system (for example, after the updating of a control subject of upper or middle level). The secure OS plays the role of the protection module 230, whereby the element of the technological system 110 works under the control of the secure OS that has been revised for this element of the TS 110 to ensure its proper functioning. As a result, the known vulnerabilities of the control subject are eliminated and its functionality can be expanded in dependence on the requirements for the control subject to ensure compatibility with new processes of the technological system.

Such a consecutive transfer of the elements of the technological system 110 to the control of a protected system enables a step by step moving of all the elements of the technological system 110 under the control of the protected OS, that is, a moving of the technological system as a whole under the control of the protected OS.

Figure 3:
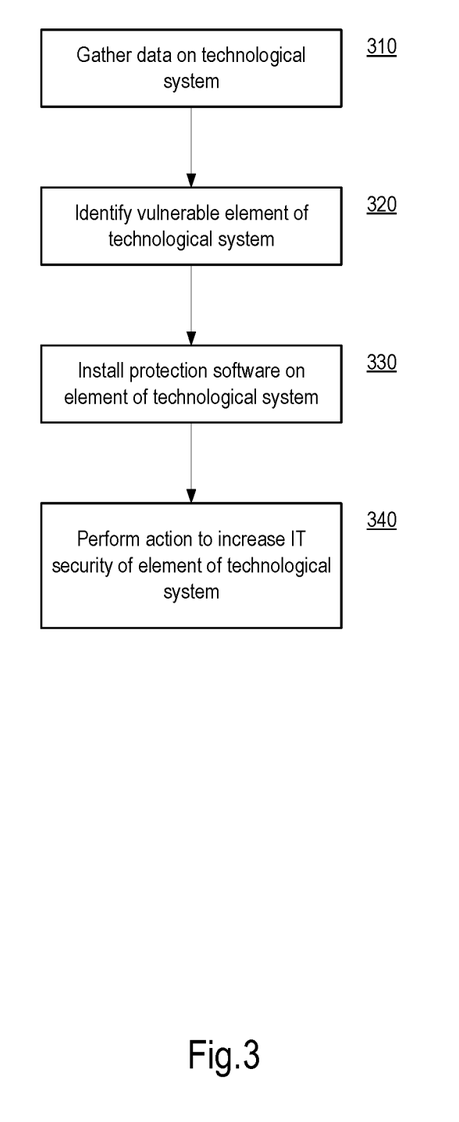
FIG. 3 shows an example of the realization of the proposed method for stepwise increasing the IT security of a technological system, in accordance with exemplary aspects of the present disclosure.

FIG. 3 shows an example of a realization of the proposed method of analysis of a file for harmfulness in a virtual machine.

In the initial step 310, the collection module 210 is used to gather data on the technological system and on every element of the technological system 110. In one variant aspect, the collection module 210 functions on a server and gathers information on the elements of the TS 110 remotely, for example, by intercepting the traffic between the elements of the TS 110 or by interacting with the elements of the TS 110 using industrial protocols for data exchange. In another variant aspect, the collection module 210 may reside on an element of the TS 110, for example in the form of a program agent, which gathers the necessary data about the element of the TS 110 and its links to other elements of the TS 110. In yet another variant aspect, the collection module 210 will carry out a monitoring of the elements of the TS 110, in order to gather statistics on errors and malfunctions occurring during its functioning.

Next, in step 320, the analysis module 220 is used to identify vulnerabilities of the technological system and at least one most vulnerable element of the technological system 110. In one variant aspect, methods of identifying vulnerabilities known in the prior art are used by the analysis module 220. In another variant aspect, the vulnerabilities are identified by a suspicious action on an element of the TS 110 from the analysis module 220.

Next, in step 330, the protection module 230 is installed on the identified vulnerable elements of the technological system 110. In one variant aspect, the protection module 230 is a protected operating system.

Next, in step 330, the protection module 230 is used to perform at least one action ensuring the IT security of the identified vulnerable elements of the technological system 110. In one variant aspect, the action ensuring the IT security of the element of the technological system 110 is a working of the element of the technological system under the control of a protected operating system, implemented in hypervisor mode. In another variant aspect, the action ensuring the IT security of the element of the technological system 110 is the launching of a protected operating system on the element of the technological system, implemented in hypervisor mode.

In yet another variant aspect, the protection module 230 interacts with the element of the technological system 110 whose security has been increased by the protection module 230 via an agent installed on the element of the technological system 110.

Figure 4:
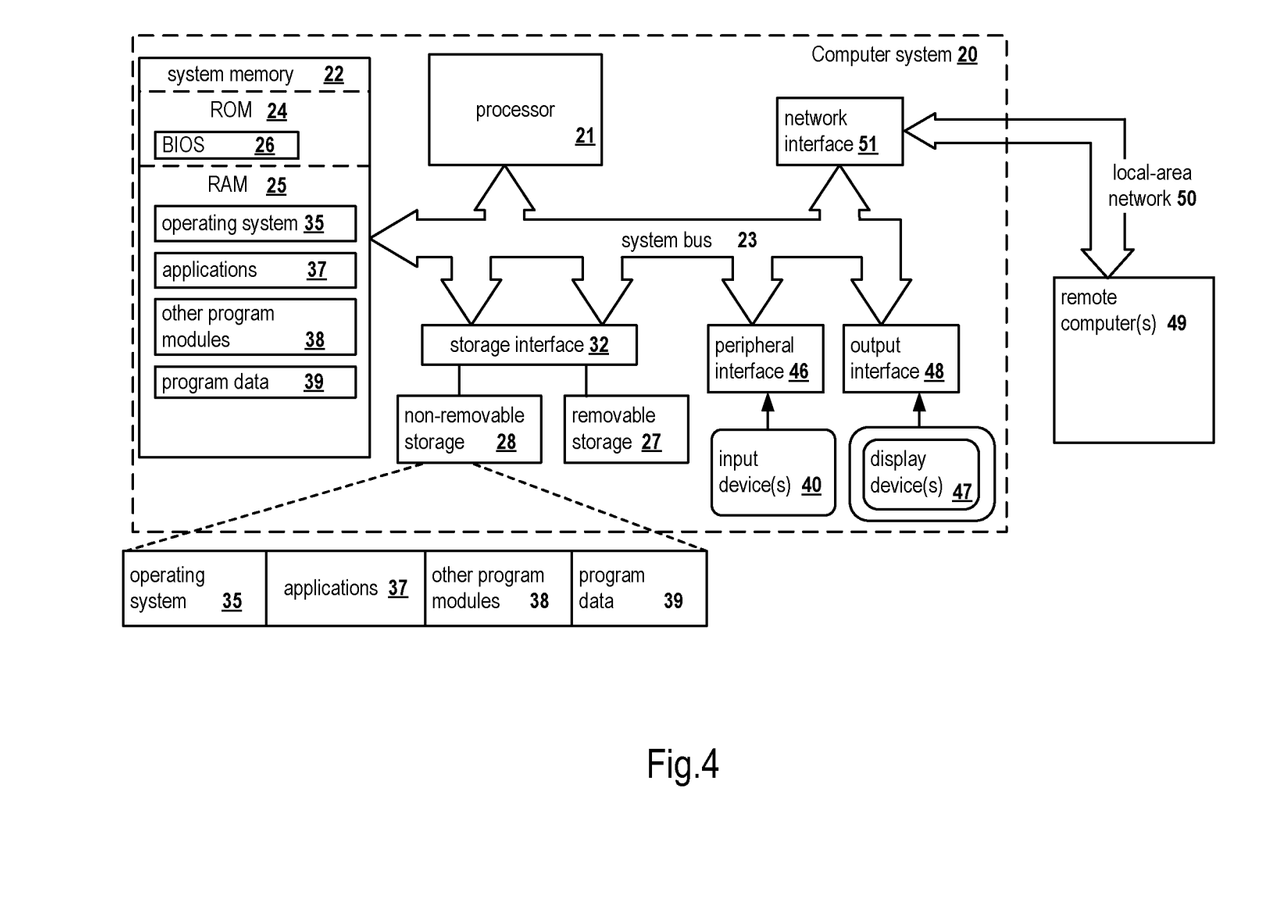
FIG. 4 presents an example of a general-purpose computer system on which the present disclosure can be realized, according to exemplary aspects of the disclosure

FIG. 4 is a block diagram illustrating a computer system 20 on which aspects of systems and methods of stepwise increasing the IT security of elements of a technological system may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of increasing the cybersecurity of an industrial technological system, comprising:
    gathering data on a plurality of elements of the industrial technological system by intercepting traffic between the plurality of elements using data exchange protocols;
    identifying vulnerable elements of the industrial technological system by one or more of:
    detecting suspicious actions on the vulnerable elements and statistical data relating to the elements;
    analyzing the vulnerable elements to generate a classification of severity of vulnerabilities of the vulnerable elements;
    identifying one or more most vulnerable elements of the industrial technological system as compared to other vulnerable elements based on the classification of severity of vulnerabilities of the vulnerable elements;
    determining compatibility of hardware components of the one or more most vulnerable elements with a protected operating system (OS) and a possibility of functioning of the one or more most vulnerable elements under control of the protected OS;
    when hardware components of the one or more most vulnerable elements are compatible with the protected OS, launching the protected OS in a hypervisor mode; and
    transferring functions of the compatible hardware components of the one or more most vulnerable elements to the protected OS to securely control exchange of data between the plurality of elements of the technological system.

2. The method of claim 1, wherein the data comprises a structure of one or more levels of the industrial technological system, and a plurality of links between the plurality of elements at and across each level.

3. The method of claim 1, further comprising:
    monitoring the plurality of elements of the industrial technological systems to gather error and malfunction information, comprising one or more of: failure of a sensor, infecting of a computer with a virus and opening of a malicious file.

4. The method of claim 1, wherein the statistical data indicates errors and failures during a predetermined period of time for each of the vulnerable elements.

5. The method of claim 1, wherein the industrial technological system is functionally available during the transferring.

6. The method of claim 1, wherein securely controlling exchange of data comprises:
    providing interaction between elements whose protection is increased and other elements of the plurality of elements using an agent installed in the industrial technological system.

7. The method of claim 1, wherein securely controlling exchange of data comprises: transferring control of the vulnerable elements to a protected operating system.

8. A security system of increasing the cybersecurity of an industrial technological system, the security system comprising:
    a hardware processor configured to:
    gather data on a plurality of elements of the industrial technological system by intercepting traffic between the plurality of elements using data exchange protocols;
    identify vulnerable elements of the industrial technological system by one or more of:
    detecting suspicious actions on the vulnerable elements and statistical data relating to the elements;
    analyze the vulnerable elements to generate a classification of severity of vulnerabilities of the vulnerable elements;
    identify one or more most vulnerable elements as compared to other vulnerable elements based on the classification of severity of vulnerabilities of the vulnerable elements;
    determine compatibility of hardware components of the one or more most vulnerable elements with a protected operating system (OS) and a possibility of functioning of the one or more most vulnerable elements under control of the protected OS;
    when hardware components of the one or more most vulnerable elements are compatible with the protected OS, launch the protected OS in a hypervisor mode; and
    transfer functions of the compatible hardware components of the one or more most vulnerable elements to the protected OS to securely control exchange of data between the plurality of elements of the technological system.

9. The security system of claim 8, wherein the data comprises a structure of one or more levels of the industrial technological system, and a plurality of links between the plurality of elements at and across each level.

10. The security system of claim 8, wherein the hardware processor is further configured to:
    monitor the plurality of elements of the industrial technological systems to gather error and malfunction information, comprising one or more of: failure of a sensor, infecting of a computer with a virus and opening of a malicious file.

11. The security system of claim 8, wherein the statistical data indicates errors and failures during a predetermined period of time for each of the vulnerable elements.

12. The security system of claim 8, wherein the industrial technological system is functionally available during the transferring.

13. The security system of claim 8, wherein the hardware processor configured to securely control exchange of data is further configured to:
    provide interaction between elements whose protection is increased and other elements of the plurality of elements using an agent installed in the industrial technological system.

14. The security system of claim 8, wherein the hardware processor configured to securely control exchange of data is further configured to:
    transfer control of the vulnerable elements to a protected operating system.

15. A non-transitory computer-readable medium, storing instructions thereon for stepwise increasing the cybersecurity of an industrial technological system, the instructions comprising:

gathering data on a plurality of elements of the industrial technological system by intercepting traffic between the plurality of elements using data exchange protocols;

identifying vulnerable elements of the industrial technological system by one or more of:

detecting suspicious actions on the vulnerable elements and statistical data relating to the elements;

analyzing the vulnerable elements to generate a classification of severity of vulnerabilities of the vulnerable elements;

identifying one or more most vulnerable elements of the industrial technological system as compared to other vulnerable elements based on the classification of severity of vulnerabilities of the vulnerable elements;

determining compatibility of hardware components of the one or more most vulnerable elements with a protected operating system (OS) and a possibility of functioning of the one or more most vulnerable elements under control of the protected OS;

when hardware components of the one or more most vulnerable elements are compatible with the protected OS, launching the protected OS in a hypervisor mode; and transferring functions of the compatible hardware components of the one or more most vulnerable elements to the protected OS to securely control exchange of data between the plurality of elements of the technological system.

\* \* \* \* \*